United States Patent
Kitamoto

(10) Patent No.: US 12,291,119 B2
(45) Date of Patent: May 6, 2025

(54) POWER SUPPLY SYSTEM FOR MOVING BODY

(71) Applicant: HONDA MOTOR CO., LTD., Tokyo (JP)

(72) Inventor: Ryota Kitamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 18/378,435

(22) Filed: Oct. 10, 2023

(65) Prior Publication Data

US 2024/0116384 A1    Apr. 11, 2024

(30) Foreign Application Priority Data

Oct. 11, 2022    (JP) .................... 2022-163385

(51) Int. Cl.
| | |
|---|---|
| *B60L 53/60* | (2019.01) |
| *B60L 50/75* | (2019.01) |
| *B60L 53/14* | (2019.01) |
| *B60L 53/20* | (2019.01) |

(52) U.S. Cl.
CPC ........... *B60L 53/60* (2019.02); *B60L 50/75* (2019.02); *B60L 53/14* (2019.02); *B60L 53/20* (2019.02)

(58) Field of Classification Search
None
See application file for complete search history.

(56) References Cited

U.S. PATENT DOCUMENTS

| | | | |
|---|---|---|---|
| 2014/0343776 A1* | 11/2014 | Ang ................. | B60L 58/21 701/22 |
| 2017/0012453 A1* | 1/2017 | Momo ............. | H01M 10/4242 |
| 2022/0032789 A1 | 2/2022 | Dallinger et al. | |
| 2022/0311270 A1* | 9/2022 | Hashiga .......... | B60R 16/03 |

* cited by examiner

*Primary Examiner* — Jared Fureman
*Assistant Examiner* — Aqeel H Bukhari
(74) *Attorney, Agent, or Firm* — Paratus Law Group, PLLC

(57) ABSTRACT

A power supply system for moving body, includes, a power generation unit, a power storage unit, a converter provided between the power generation unit and the power storage unit, the converter including a power storage unit-side converter terminal and a power generation unit-side converter terminal, an external connection terminal configured to electrically connect to an external device, a first switching unit configured to switch between connected and disconnected of the external connection terminal, the power storage unit, and the power storage unit-side converter terminal, a second switching unit configured to switch between connected and disconnected of the power generation unit-side converter terminal and the external connection terminal, a third switching unit configured to switch between connected and disconnected of the power generation unit-side converter terminal and the power generation unit, and a control device configured to control the first switching unit, the second switching unit, and the third switching unit.

10 Claims, 5 Drawing Sheets

(FIRST EXTERNAL CHARGING)

POWER SUPPLY SYSTEM FOR MOVING BODY

CROSS-REFERENCE TO RELATED APPLICATIONS

This application is based on and claims priority under 35 USC 119 from Japanese Patent Application No. 2022-163385 filed on Oct. 11, 2022, which is hereby incorporated by reference in its entirety.

TECHNICAL FIELD

The present invention relates to a power supply system for moving body.

BACKGROUND ART

In recent years, researches and developments have been conducted on charging and power supplying for a mobility provided with a secondary battery, which contributes to energy efficiency, in order to allow more people to have access to affordable, reliable, sustainable and advanced energy.

Regarding charging and power supplying in a mobility provided with a secondary battery, charging equipment such as charging stations includes two types, 400 V class compatible and 800 V class compatible. If the mobility is compatible to only 400 V class compatible charging equipment, in 800 V class compatible charging equipment, the mobility cannot enjoy the quick charging performance of the 800 V class compatible charging equipment.

Here, U.S. Patent Application Publication No. 2022/0032789 describes that charging is possible in both 400 V class compatible charging equipment and 800 V class compatible charging equipment by providing a voltage converter for charging.

SUMMARY

A voltage converter for charging, however, is generally large, heavy, and expensive. In particular, in a system including a power generation unit such as a fuel cell, a voltage converter is provided between the power generation unit and a secondary battery.

Therefore, it is desirable to effectively utilize this voltage converter also upon charging from the charging equipment.

The present invention provides a power storage system for moving body that enables efficient charging according to the voltage state of charging equipment by effectively utilizing a converter provided between a power generation unit and a power storage unit.

According to the present invention, it is possible to efficiently charge according to the voltage state of charging equipment by effectively utilizing a converter provided between a power generation unit and a power storage unit.

DESCRIPTION OF EMBODIMENTS

Hereinafter, embodiments of the present invention will be described with reference to the drawings.

Figure 1:
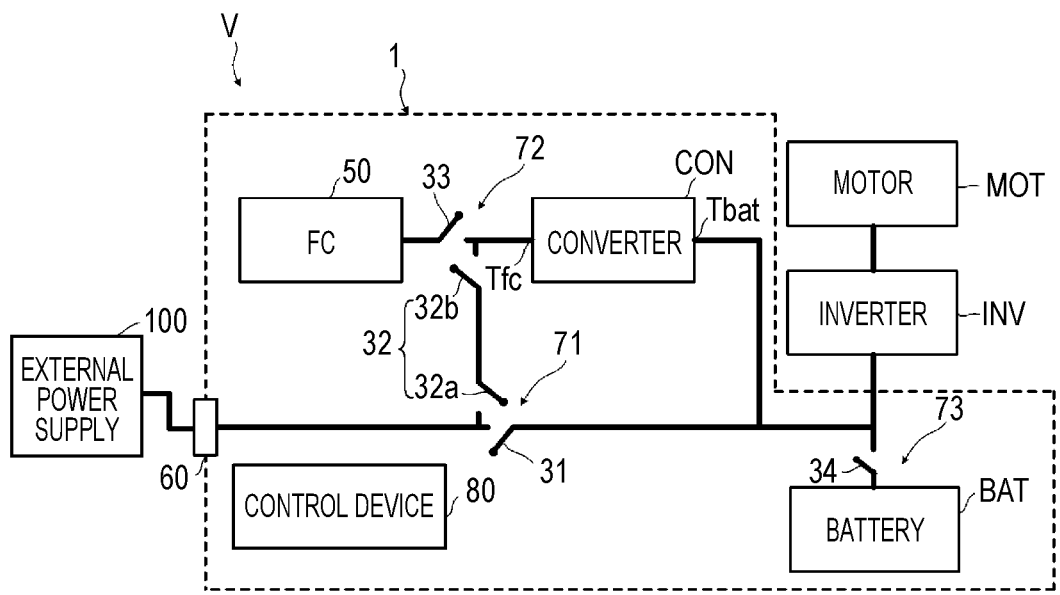
FIG. 1 is a diagram illustrating a configuration of a moving body V provided with a power supply system 1 of a first embodiment.

A power supply system 1 of a first embodiment illustrated in FIG. 1 is mounted on a moving body V such as an electric vehicle or a fuel cell vehicle. The moving body V includes a motor MOT and an inverter INV in addition to the power supply system 1. The motor MOT is a three-phase motor that is rotationally driven by electric power supplied from the power supply system 1 via the inverter INV. The inverter INV converts DC power supplied from the power supply system 1 into three-phase AC power by switching the plurality of switching elements to rotationally drive the motor MOT.

As illustrated in FIG. 1, the power supply system 1 includes, as a basic configuration: a battery BAT that can be charged and discharged by a first voltage (for example, 800 V); a power generation unit 50 (FC in the drawing) that generates DC power; a converter CON that steps up DC power of a predetermined voltage (for example; 200 V to 300 V) generated by the power generation unit 50 to the first voltage; and an external connection terminal 60 that can be connected with external devices such as an external power supply 100 and an external electric device 200.

The power supply system 1 also includes a first switching mechanism 71, a second switching mechanism 72, a third switching mechanism 73, and a control device 80. According to the power supply system 1, based on the switching control of the first switching mechanism 71, the second switching mechanism 72, and the third switching mechanism 73 by the control device 80 to be described later, the battery BAT can be charged and the motor M can be driven with the power generated by the power generation unit 50. This also achieves in addition: first external charging (see FIG. 2) of charging the battery BAT with the external power supply 100 of the first voltage; second external charging (see FIG. 3) of charging the battery BAT with the external power supply 100 of the second voltage (for example, 400 V); first external power supplying (see FIG. 4) of supplying the first voltage from the battery BAT to the external electric device 200; second external power supplying (see FIG. 5) of supplying a predetermined voltage from the battery BAT to the external electric device 200; third external power supplying (see FIG. 6) of supplying a predetermined voltage from the power generation unit 50 to the external electric device 200; fourth external power supplying (see FIG. 7) of supplying the first voltage from the battery BAT and the power generation unit 50 to the external electric device 200; and fifth external power supplying (see FIG. 8) of supplying a predetermined voltage from the battery BAT and the power generation unit 50 to the external electric device 200. Hereinafter, the configuration of each unit of the power supply system 1 will be specifically described.

The battery BAT connects in series multiple cells including lithium-ion batteries, all-solid-state batteries, or the like, and achieves charging and discharging by the first voltage.

The power generation unit 50 is, for example, a fuel cell and generates DC power of a predetermined voltage.

The converter CON is a DC-DC converter provided between the power generation unit 50 and the battery BAT, and steps up or steps down DC power of a predetermined voltage generated by the power generation unit 50 to the first voltage or a predetermined voltage different from the first voltage. The predetermined voltage is a variable value. The converter CON includes a battery-side converter terminal Tbat and a power generation unit-side converter terminal Tfc. and steps up or steps down electric power of a predetermined voltage input from the power generation unit-side converter terminal Tfc to a first voltage or a predetermined voltage to output from the battery-side converter terminal Tbat. The converter CON of the present embodiment is a bidirectional converter, and can step down the electric power of the first voltage input from the battery-side converter terminal Tbat to the second voltage or step up or step down the electric power to a predetermined voltage different from the second voltage to output from the power generation unit-side converter terminal Tfc.

The external connection terminal 60 can connect the external power supply 100 of the first voltage or the second voltage and external electric devices 200 of various rated voltages. The external connection terminal 60 includes a unit for transmitting and receiving various types of information between the connected external power supply 100 or external electric device 200 and the control device 80. For example, during external charging, information is transmitted and received in the following procedure. (1) Send charger specification information (adaptable voltage information, etc.) from the external power supply 100 to the control device 80.

(2) Send state information (adaptable voltage information, charge balance information, etc.) of the battery BAT from the control device 80 to the external power supply 100.

(3) Send a charging permission signal from the control device 80 to the external power supply 100. (4) Continuously send a charging current command value from the control device 80 to the external power supply 100.

(5) The external power supply 100 controls the charging current based on the charging current command value.

The first switching mechanism 71 includes: a first switching unit 31 that selectively switches between connected and disconnected of the external connection terminal 60, the battery BAT and the battery-side converter terminal Tbat; and a second switching unit 32a that selectively switches between connected and disconnected of the power generation unit-side converter terminal Tfc and the external connection terminal 60.

The second switching mechanism 72 includes: a second switching unit 32b that selectively switches between connected and disconnected of the power generation unit-side converter terminal Tfc and the external connection terminal 60; and a third switching unit 33 that selectively switches between connected and disconnected of the power generation unit 50 and the power generation unit-side converter terminal Tfc. The second switching units 32a and 32b may be either one and will be described as the second switching unit 32 in the following description.

The third switching mechanism 73 includes a fourth switching unit 34 that selectively switches between connected and disconnected of the battery BAT, the first switching unit 31, and the battery-side converter terminal Tbat. The first to fourth switching units 31 to 34 may be independent of each other, or a plurality of switching units may be unitized as in the first switching mechanism 71 and the second switching mechanism 72.

The control device 80 controls the power supply system 1 to the first to fifth states based on the switching control of the first to fourth switching units 31 to 34.

Figure 2:
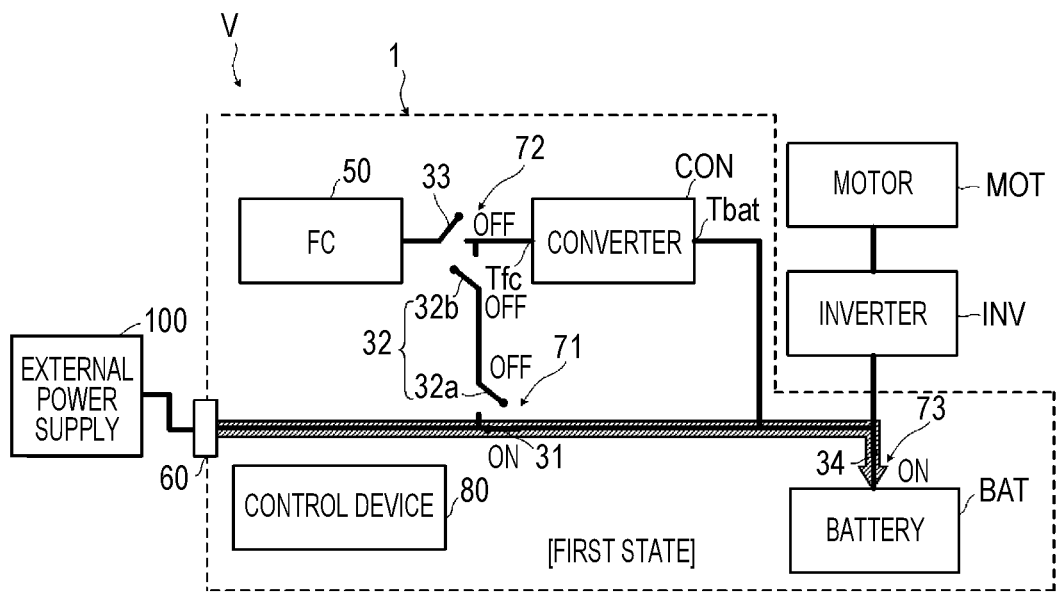
FIG. 2 is a diagram illustrating a charging state (first external charging) of a battery BAT of the power supply system 1 of the first embodiment by an external power supply 100 (first voltage).
Figure 4:
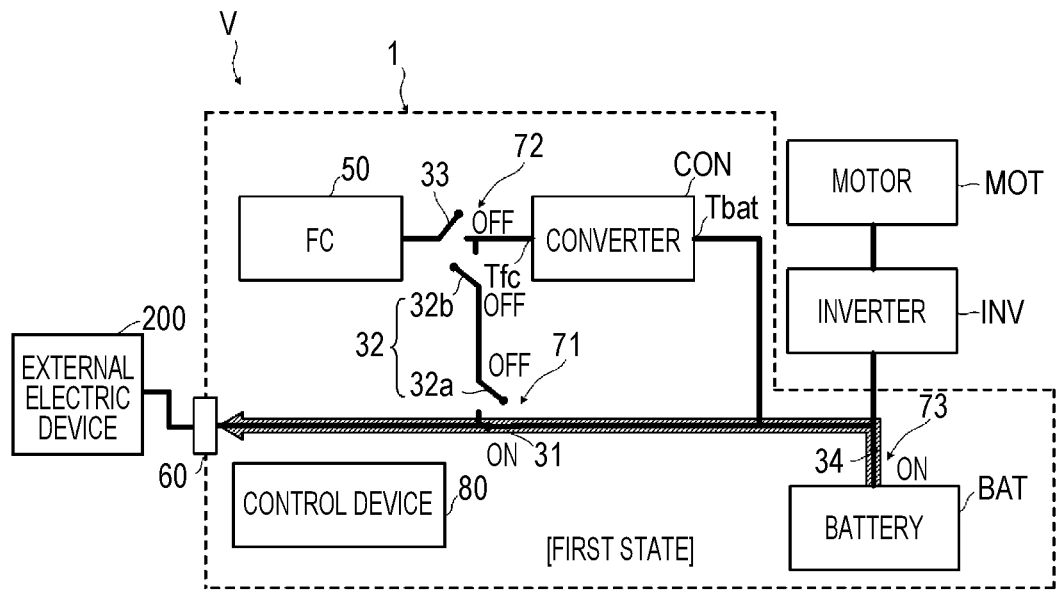
FIG. 4 is a diagram illustrating a power supplying state (first external power supplying) from the battery BAT of the power supply system 1 of the first embodiment to an external electric device 200 (first voltage).

As illustrated in FIGS. 2 and 4, the first state is a state in which the external connection terminal 60 and the battery BAT are connected without passing the converter CON. In order to bring the power supply system 1 into the first state, the control device 80 controls the first switching unit 31 such that the external connection terminal 60, the battery BAT, and the battery-side converter terminal Tbat are connected, controls the second switching unit 32 such that the power generation unit-side converter terminal Tfc and the external connection terminal 60 are disconnected, and controls the third switching unit 33 such that the power generation unit-side converter terminal Tfc and the power generation unit 50 are disconnected.

Figure 3:
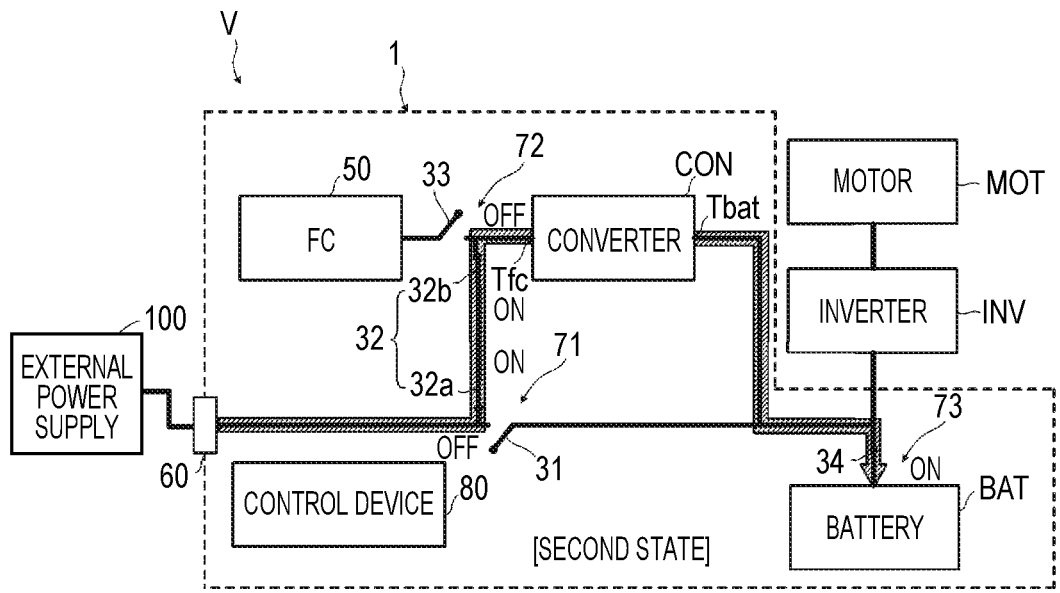
FIG. 3 is a diagram illustrating a charging state (second external charging) of the battery BAT of the power supply system 1 of the first embodiment by the external power supply 100 (second voltage).
Figure 5:
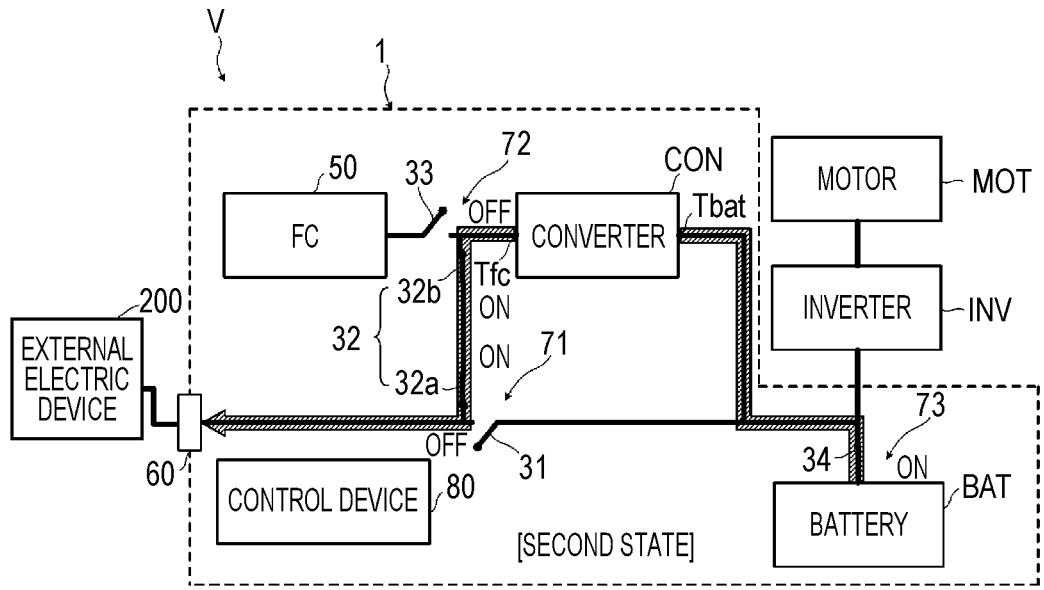
FIG. 5 is a diagram illustrating a power supplying state (second external power supplying) from the battery BAT of the power supply system 1 of the first embodiment to the external electric device 200.

As illustrated in FIGS. 3 and 5, the second state is a state in which the external connection terminal 60 and the battery BAT are connected via the converter CON. In order to bring the power supply system 1 into the first state, the control device 80 controls the first switching unit 31 such that the external connection terminal 60, the battery BAT, and the battery-side converter terminal Tbat are disconnected, controls the second switching unit 32 such that the power generation unit-side converter terminal Tfc and the external connection terminal 60 are connected, and controls the third switching unit 33 such that the power generation unit-side converter terminal Tfc and the power generation unit 50 are disconnected.

Figure 6:
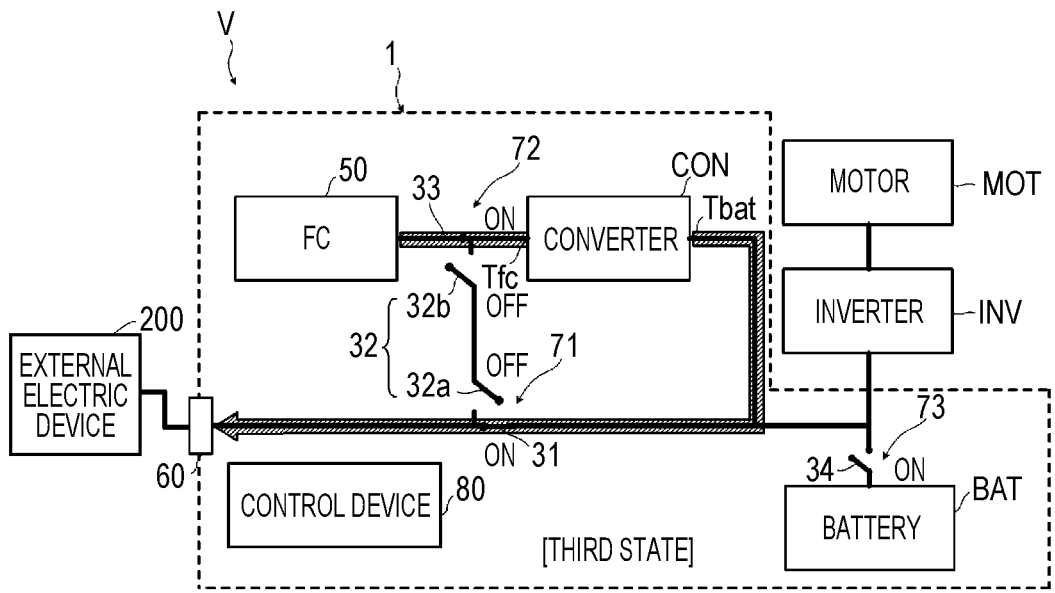
FIG. 6 is a diagram illustrating a power supplying state (third external power supplying) from a power generation unit 50 of the power supply system 1 of the first embodiment to the external electric device 200.
Figure 7:
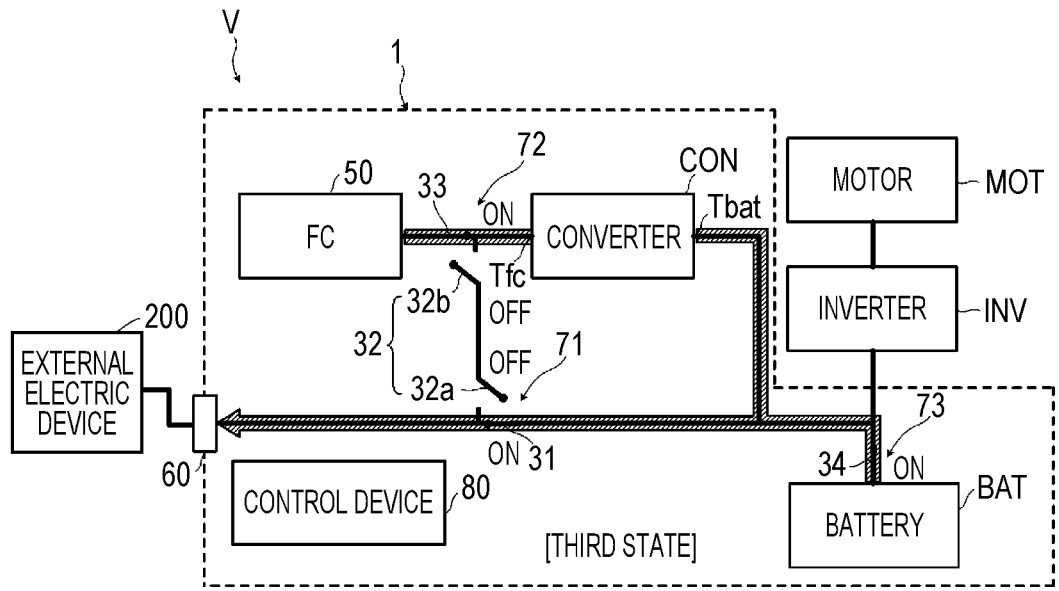
FIG. 7 is a diagram illustrating a power supplying state (fourth external power supplying) from the battery BAT and the power generation unit 50 of the power supply system 1 of the first embodiment to the external electric device 200 (first voltage).

As illustrated in FIGS. 6 and 7, the third state is a state in which the external connection terminal 60 and the power generation unit 50 are connected via the converter CON. In order to bring the power supply system 1 into the third state, the control device 80 controls the first switching unit 31 such that the external connection terminal 60, the battery BAT, and the battery-side converter terminal Tbat are connected, controls the second switching unit 32 such that the power generation unit-side converter terminal Tfc and the external connection terminal 60 are disconnected, and controls the third switching unit 33 such that the power generation unit-side converter terminal Tfc and the power generation unit 50 are connected.

Figure 8:
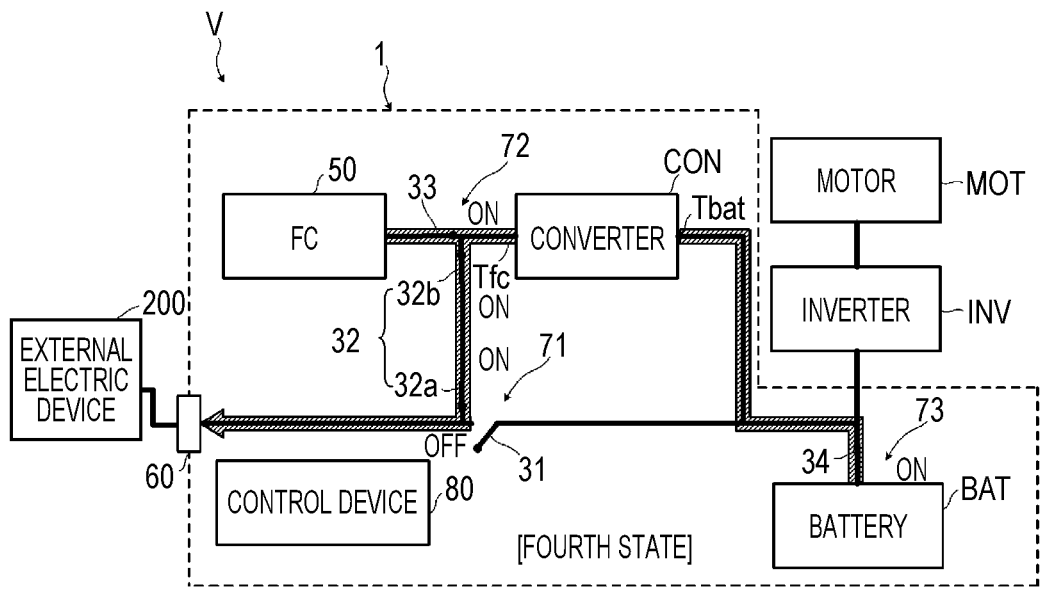
FIG. 8 is a diagram illustrating a power supplying state (fifth external power supplying) from the battery BAT and the power generation unit 50 of the power supply system 1 of the first embodiment to the external electric device 200.

As illustrated in FIG. 8, the fourth state is a state in which the external connection terminal 60 and the battery BAT are connected via the converter CON, and the external connection terminal 60 and the power generation unit 50 are connected without passing the converter CON. In order to bring the power supply system 1 into the fourth state, the control device 80 controls the first switching unit 31 such that the external connection terminal 60, the battery BAT, and the battery-side converter terminal Tbat are disconnected, controls the second switching unit 32 such that the power generation unit-side converter terminal Tfc and the external connection terminal 60 are connected, and controls the third switching unit 33 such that the power generation unit-side converter terminal Tfc and the power generation unit 50 are connected.

Although not illustrated, the fifth state is a state in which the power generation unit 50 and the battery BAT are connected via the converter CON. In order to bring the power supply system 1 into the fifth state, the control device 80 controls the first switching unit 31 such that the external connection terminal 60, the battery BAT, and the battery-side converter terminal Tbat are disconnected, controls the second switching unit 32 such that the power generation unit-side converter terminal Tfc and the external connection terminal 60 are disconnected, and controls the third switching unit 33 such that the power generation unit-side converter terminal Tfc and the power generation unit 50 are connected. The fifth state is selected when power is supplied from the power generation unit 50 to the battery BAT and/or the motor MOT, such as when the moving body V is traveling.

In the power supply system 1 configured as described above, the control device 80 enables the first and second external charging and the first to fifth external power supplying described later based on the switching control of the first to fourth switching units 31 to 34. Hereinafter, the switching control of the control device 80 will be described with reference to FIGS. 2 to 8.

When the external power supply 100 is connected to the external connection terminal 60, the control device 80 acquires the charger specification information from the external power supply 100, and brings the power supply system 1 to the first state to charge the battery BAT if the adaptable voltage of the external power supply 100 is the first voltage (for example, 800 V) as illustrated in FIG. 2. That is, if the voltage of the charging equipment (the external power supply 100) and the voltage of the battery BAT are equal to each other, charging is performed without passing through the converter CON, so that the loss upon charging can be reduced.

If the adaptable voltage of the external power supply 100 is the second voltage (for example, 400 V), as illustrated in FIG. 3, the control device 80 brings the power supply system 1 into the second state to charge the battery BAT. That is, if the voltage of the charging equipment (the external power supply 100) and the voltage of the battery BAT are different from each other, charging becomes possible regardless of the voltage of the charging equipment by passing through the converter CON. Further, by using the converter CON for controlling the power of the power generation unit 50 for voltage control during external charging, it is possible to reduce the number of components and the weight.

When the external electric device 200 is connected to the external connection terminal 60, the control device 80 acquires the electric device specification information from the external electric device 200, and selectively executes either the first external power supplying illustrated in FIG. 4 or the fourth external power supplying illustrated in FIG. 7 if the adaptable voltage of the external electric device 200 is the first voltage. For example, the control device 80 selects one of the external power supplying modes based on the charge balance of the battery BAT and the fuel balance of the power generation unit 50.

If the first external power supplying is selected, as illustrated in FIG. 4, the control device 80 brings the power supply system 1 to the first state to supply power to the external electric device 200. That is, if the voltage of the external electric device 200 connected to the external connection terminal 60 is equal to the voltage of the battery BAT, power is supplied without passing through the converter CON, so that the loss upon power supplying can be reduced.

If the fourth external power supplying is selected, as illustrated in FIG. 7, the control device 80 brings the power supply system 1 to the third state to supply the power of the power generation unit 50 via the converter CON and the power of the battery BAT to the external electric device 200. According to the fourth external power supplying, it is possible to supply the power of the power generation unit 50 and the battery BAT to the external electric device 200 of the first voltage.

On the other hand, if the adaptable voltage of the external electric device 200 connected to the external connection terminal 60 is different from the first voltage, the control device 80 selectively executes one of the second external power supplying illustrated in FIG. 5, the third external power supplying illustrated in FIG. 6, or the fifth external power supplying illustrated in FIG. 8. For example, the control device 80 selects one of the external power supplying modes based on the charge balance of the battery BAT and the fuel balance of the power generation unit 50.

If the second external power supplying is selected, as illustrated in FIG. 5, the control device 80 brings the power supply system 1 to the second state to supply power to the external electric device 200 connected to the external connection terminal 60. According to the second external power supplying, the power of the battery BAT can be appropriately converted and supplied to the external electric device 200 by passing through the converter CON.

If the third external power supplying is selected, as illustrated in FIG. 6, the control device 80 brings the power supply system 1 to the third state to supply the power of the power generation unit 50 to the external electric device 200 via the converter CON. According to such third external power supplying, it is possible to supply power to the external electric device 200 with only the power generated by the power generation unit 50.

If the fifth external power supplying is selected, as illustrated in FIG. 8, the control device 80 brings the power supply system 1 to the fourth state to supply the power of the battery BAT via the converter CON and the power of the power generation unit 50 to the external electric device 200. According to the fifth external power supplying, power can be supplied to the external electric device 200 by the power of the power generation unit 50 and the battery BAT.

Next, a power supply system 1 according to a second embodiment will be described with reference to FIGS. 9 and 10.

Figure 9:
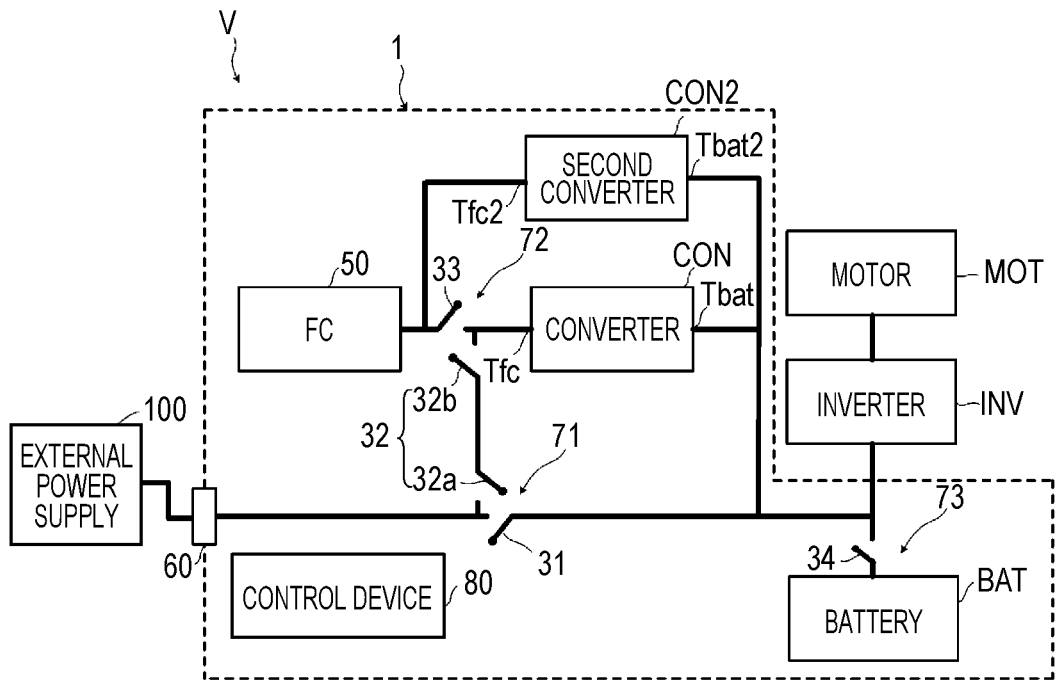
FIG. 9 is a diagram illustrating a configuration of a moving body V provided with a power supply system 1 of a second embodiment.
Figure 10:
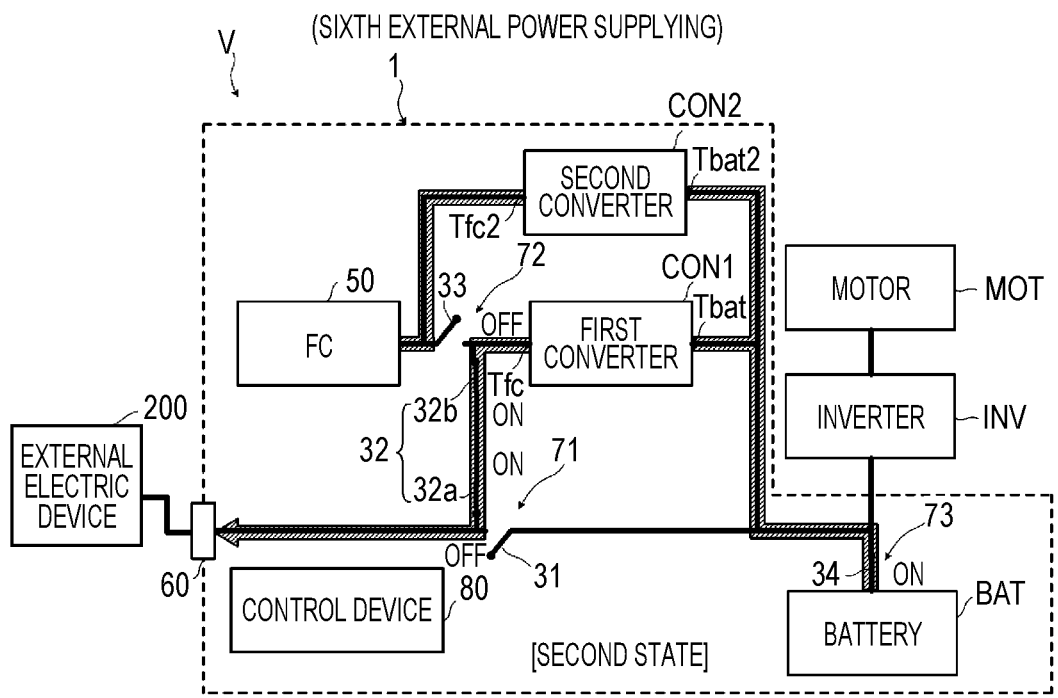
FIG. 10 is a diagram illustrating a power supplying state (sixth external power supplying) from the battery BAT and the power generation unit 50 of the power supply system 1 of the second embodiment to the external electric device 200.

As illustrated in FIG. 9, the power supply system 1 of the second embodiment is different from the power supply system 1 of the first embodiment by including a first converter CON1 corresponding to the converter CON of the first embodiment and a second converter CON2 connected in parallel to the first converter CON1. The second converter CON2 includes: a battery-side converter terminal Tbat2 connected to the battery BAT; and a power generation unit-side converter terminal Tfc2 connected to the power generation unit 50. The power generation unit-side converter terminal Tfc2 is connected between the power generation unit 50 and the third switching unit 33.

The second converter CON2 is a DC-DC converter that steps up the DC power of a predetermined voltage generated by the power generation unit 50 to the first voltage. According to the power supply system 1 of the second embodiment including such a second converter CON2, if the power supply system 1 is not connected to the external power supply 100 or the external electric device 200, by setting the power supply system 1 to the fifth state, the first converter CON1 and the second converter CON2 can serve as a multiphase converter, and the power generated by the power generation unit 50 can be efficiently converted into the first voltage. Further, according to the power supply system 1 of the second embodiment, the sixth external power supplying illustrated in FIG. 10 can be achieved.

If the adaptable voltage of the external electric device 200 connected to the external connection terminal 60 is different from the first voltage, the control device 80 of the second embodiment can select the sixth external power supplying based on the charge balance of the battery BAT and the fuel balance of the power generation unit 50. If the sixth external power supplying is selected, as illustrated in FIG. 10, the control device 80 of the second embodiment brings the power supply system 1 into the second state to supply the power of the power generation unit 50 via the second converter CON2 and the power of the battery BAT to the external electric device 200, which is connected to the external connection terminal 60 via the first converter CON1. According to the sixth external power supplying, it is possible to supply the power of the power generation unit 50 via the second converter CON2 and the first converter CON1 and the power of the battery BAT via the first converter CON1 to the external electric device 200 of the second voltage.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiments may be freely combined without departing from the gist of the invention.

In the present specification, at least the following matters are described. Corresponding constituent elements and the like in the embodiment described above are shown in parentheses, but the present invention is not limited thereto.

(1) A power supply system (power supply system 1) for moving body (moving body V), including:
 a power generation unit (power generation unit 50);
 a power storage unit (battery BAT);
 a converter (converter CON) provided between the power generation unit and the power storage unit, the converter including a power storage unit-side converter terminal (battery-side converter terminal Tbat) and a power generation unit-side converter terminal (power generation unit-side converter terminal Tfc);
 an external connection terminal (external connection terminal 60) configured to electrically connect to an external device (external power supply 100, external electric device 200);
 a first switching unit (first switching unit 31) configured to switch between connected and disconnected of the external connection terminal, the power storage unit, and the power storage unit-side converter terminal;
 a second switching unit (second switching unit 32) configured to switch between connected and disconnected of the power generation unit-side converter terminal and the external connection terminal;
 a third switching unit (third switching unit 33) configured to switch between connected and disconnected of the power generation unit-side converter terminal and the power generation unit; and
 a control device (control device 80) configured to control the first switching unit, the second switching unit, and the third switching unit.

According to (1), the converter that controls the power of the power generation unit can be used for voltage control during external charging, in which the power storage unit is charged from the external power supply, thereby reducing the number of components and the weight. Further, the power storage unit can be charged regardless of the voltage of the charging equipment.

(2) The power supply system for moving body according to (1), in which
 the control device charges the power storage unit in a first state in which
 the first switching unit is controlled such that the external connection terminal, the power storage unit, and the power storage unit-side converter terminal are connected,
 the second switching unit is controlled such that the power generation unit-side converter terminal and the external connection terminal are disconnected, and
 the third switching unit is controlled such that the power generation unit-side converter terminal and the power generation unit are disconnected,
 or alternatively,
 the control device charges the power storage unit from the external device in a second state in which
 the first switching unit is controlled such that the external connection terminal, the power storage unit, and the power storage unit-side converter terminal are disconnected,
 the second switching unit is controlled such that the power generation unit-side converter terminal and the external connection terminal are connected, and
 the third switching unit is controlled such that the power generation unit-side converter terminal and the power generation unit are disconnected.

According to (2), if the voltage of the charging equipment and the voltage of the power storage unit are equal to each other, charging is performed without passing through the converter, so that the loss upon charging can be reduced. On the other hand, if the voltage of the charging equipment and the voltage of the power storage unit are different from each other, charging becomes possible regardless of the voltage of the charging equipment by passing through the converter.

(3) The power supply system for moving body according to (1), in which
 the converter is a bidirectional converter, and the control device supplies power from the power storage unit to the external device in a first state in which the first switching unit is controlled such that the external connection terminal, the power storage unit, and the power storage unit-side converter terminal are connected, the second switching unit is controlled such that the power generation unit-side converter terminal and the external connection terminal are disconnected, and the third switching unit is controlled such that the power generation unit-side converter terminal and the power generation unit are disconnected, or alternatively, the control device supplies power from the power storage unit to the external device in a second state in which the first switching unit is controlled such that the external connection terminal, the power storage unit, and the power storage unit-side converter terminal are disconnected, the second switching unit is controlled such that the power generation unit-side converter terminal and the external connection terminal are connected, and the third switching unit is controlled such that the power generation unit-side converter terminal and the power generation unit are disconnected.

According to (3), if the voltage of the external electric device and the voltage of the power storage unit are equal to each other, power is supplied without passing through the converter, so that the loss upon power supplying can be reduced. On the other hand, if the voltage of the external electric device and the voltage of the power storage unit are different from each other, power can be supplied regardless of the voltage of the external electric device by passing through the converter.

(4) The power supply system for moving body according to (1), in which the converter is a bidirectional converter, and the control device supplies power from the power generation unit to the external device via the converter in a third state in which the first switching unit is controlled such that the external connection terminal, the power storage unit, and the power storage unit-side converter terminal are connected, the second switching unit is controlled such that the power generation unit-side converter terminal and the external connection terminal are disconnected, and the third switching unit is controlled such that the power generation unit-side converter terminal and the power generation unit are connected.

According to (4), power can be supplied to the external electric device using the power of the power generation unit, and the voltage of the power generation unit can be controlled by the converter, thereby enabling efficient power generation.

(5) The power supply system for moving body according to (4), further including:

a fourth switching unit configured to switch between connected and disconnected of the power storage unit, the first switching unit, and the power storage unit-side converter terminal, in which the control device supplies power from the power generation unit to the external device in the third state and in a state in which the fourth switching unit is controlled such that the power storage unit, the first switching unit, and the power storage unit-side converter terminal are disconnected.

According to (5), power can be supplied to the external electric device without being affected by the battery voltage.

(6) The power supply system for moving body according to (1), in which the control device supplies power from the power generation unit and the power storage unit to the external device in a fourth state in which the first switching unit is controlled such that the external connection terminal, the power storage unit, and the power storage unit-side converter terminal are disconnected, the second switching unit is controlled such that the power generation unit-side converter terminal and the external connection terminal are connected, and the third switching unit is controlled such that the power generation unit-side converter terminal and the power generation unit are connected.

According to (6), the power of the power generation unit and the power of the power storage unit can be supplied to the external electric device.

(7) The power supply system for moving body according to (1), further including:

a second converter provided in parallel with the converter with respect to the power storage unit, the second converter including a power storage unit-side converter terminal and a power generation unit-side converter terminal, in which the power generation unit-side converter terminal of the second converter is connected between the power generation unit and the third switching unit.

According to (7), if the external connection terminal is not connected with an external device, the converter and the second converter can be used as a multiphase converter.

(8) The power supply system for moving body according to (7), in which the control device supplies power to the external device via the converter, while adding together power transmitted from the power generation unit via the second converter and power from the power storage unit, in a second state in which the first switching unit is controlled such that the external connection terminal, the power storage unit, and the power storage unit-side converter terminal are disconnected, the second switching unit is controlled such that the power generation unit-side converter terminal and the external connection terminal are connected, and the third switching unit is controlled such that the power generation unit-side converter terminal and the power generation unit are disconnected.

According to (8), it is possible to supply power in accordance with the voltage of the external electric device while efficiently generating power with the power generation unit.

(9) The power supply system for moving body according to any one of (1) to (8), in which the moving body is an electric vehicle.

According to (9), even in an infrastructure environment for electric vehicle in which different types of charging equipment of a plurality of standards coexist, charging and power supplying is possible with low loss to each charging equipment and power supplying target.

(10) The power supply system for moving body according to any one of (1) to (8), in which the power generation unit is a fuel cell, and the movable body is a fuel cell vehicle.

According to (10), even in an infrastructure environment for electric vehicle in which different types of charging equipment of a plurality of standards coexist, charging and power supplying is possible with low loss to each charging equipment and power supplying target.

What is claimed is:

1. A power supply system for moving body, comprising:
a power generation unit;
a power storage unit;
a converter provided between the power generation unit and the power storage unit, the converter including a power storage unit-side converter terminal and a power generation unit-side converter terminal;
an external connection terminal configured to electrically connect to an external device;
a first switching unit configured to switch between connected and disconnected of the external connection terminal, the power storage unit, and the power storage unit-side converter terminal;
a second switching unit configured to switch between connected and disconnected of the power generation unit-side converter terminal and the external connection terminal;
a third switching unit configured to switch between connected and disconnected of the power generation unit-side converter terminal and the power generation unit; and
a control device configured to control the first switching unit, the second switching unit, and the third switching unit.

2. The power supply system for moving body according to claim 1, wherein
the control device charges the power storage unit in a first state in which
the first switching unit is controlled such that the external connection terminal, the power storage unit, and the power storage unit-side converter terminal are connected,
the second switching unit is controlled such that the power generation unit-side converter terminal and the external connection terminal are disconnected, and
the third switching unit is controlled such that the power generation unit-side converter terminal and the power generation unit are disconnected,
or alternatively,
the control device charges the power storage unit from the external device in a second state in which
the first switching unit is controlled such that the external connection terminal, the power storage unit, and the power storage unit-side converter terminal are disconnected,
the second switching unit is controlled such that the power generation unit-side converter terminal and the external connection terminal are connected, and
the third switching unit is controlled such that the power generation unit-side converter terminal and the power generation unit are disconnected.

3. The power supply system for moving body according to claim 1, wherein
the converter is a bidirectional converter, and
the control device supplies power from the power storage unit to the external device in a first state in which
the first switching unit is controlled such that the external connection terminal, the power storage unit, and the power storage unit-side converter terminal are connected,
the second switching unit is controlled such that the power generation unit-side converter terminal and the external connection terminal are disconnected, and
the third switching unit is controlled such that the power generation unit-side converter terminal and the power generation unit are disconnected,
or alternatively,
the control device supplies power from the power storage unit to the external device in a second state in which
the first switching unit is controlled such that the external connection terminal, the power storage unit, and the power storage unit-side converter terminal are disconnected,
the second switching unit is controlled such that the power generation unit-side converter terminal and the external connection terminal are connected, and
the third switching unit is controlled such that the power generation unit-side converter terminal and the power generation unit are disconnected.

4. The power supply system for moving body according to claim 1, wherein
the converter is a bidirectional converter, and
the control device supplies power from the power generation unit to the external device via the converter in a third state in which
the first switching unit is controlled such that the external connection terminal, the power storage unit, and the power storage unit-side converter terminal are connected,
the second switching unit is controlled such that the power generation unit-side converter terminal and the external connection terminal are disconnected, and
the third switching unit is controlled such that the power generation unit-side converter terminal and the power generation unit are connected.

5. The power supply system for moving body according to claim 4, further comprising:
a fourth switching unit configured to switch between connected and disconnected of the power storage unit, the first switching unit, and the power storage unit-side converter terminal, wherein
the control device supplies power from the power generation unit to the external device in the third state and in a state in which the fourth switching unit is controlled such that the power storage unit, the first switching unit, and the power storage unit-side converter terminal are disconnected.

6. The power supply system for moving body according to claim 1, wherein
the control device supplies power from the power generation unit and the power storage unit to the external device in a fourth state in which
the first switching unit is controlled such that the external connection terminal, the power storage unit, and the power storage unit-side converter terminal are disconnected,
the second switching unit is controlled such that the power generation unit-side converter terminal and the external connection terminal are connected, and
the third switching unit is controlled such that the power generation unit-side converter terminal and the power generation unit are connected.

7. The power supply system for moving body according to claim 1, further comprising:
a second converter provided in parallel with the converter with respect to the power storage unit, the second converter including a power storage unit-side converter terminal and a power generation unit-side converter terminal, wherein the power generation unit-side converter terminal of the second converter is connected between the power generation unit and the third switching unit.

8. The power supply system for moving body according to claim 7, wherein the control device supplies power to the external device via the converter, while adding together power transmitted from the power generation unit via the second converter and power from the power storage unit, in a second state in which the first switching unit is controlled such that the external connection terminal, the power storage unit, and the power storage unit-side converter terminal are disconnected, the second switching unit is controlled such that the power generation unit-side converter terminal and the external connection terminal are connected, and the third switching unit is controlled such that the power generation unit-side converter terminal and the power generation unit are disconnected.

9. The power supply system for moving body according to claim 1, wherein the moving body is an electric vehicle.

10. The power supply system for moving body according to claim 1, wherein the power generation unit is a fuel cell, and the movable body is a fuel cell vehicle.

* * * * *